US009764756B2

United States Patent
Sugioka et al.

(10) Patent No.: US 9,764,756 B2
(45) Date of Patent: Sep. 19, 2017

(54) STEERING WHEEL ASSEMBLY FOR RETRACTING A STEERING WHEEL IN A VEHICLE

(71) Applicant: VOLVO CAR CORPORATION, Gothenburg (SE)

(72) Inventors: Ichiro Sugioka, Newbury Park, CA (US); Douglas Hall Frasher, Newbury Park, CA (US); John Downs, Simi Valley, CA (US)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/993,262

(22) Filed: Jan. 12, 2016

(65) Prior Publication Data

US 2016/0200344 A1 Jul. 14, 2016

(30) Foreign Application Priority Data

Jan. 12, 2015 (EP) .................................... 15150728

(51) Int. Cl.
*B62D 1/181* (2006.01)
*B62D 1/183* (2006.01)

(52) U.S. Cl.
CPC ............ *B62D 1/181* (2013.01); *B62D 1/183* (2013.01)

(58) Field of Classification Search
CPC .................. B62D 1/181; B62D 1/183
See application file for complete search history.

(56) References Cited

U.S. PATENT DOCUMENTS

| 3,396,600 | A | * | 8/1968 | Zeigler | .................. | B62D 1/181 |
| | | | | | | 74/493 |
| 4,503,504 | A | | 3/1985 | Suzumura et al. | | |
| 4,922,426 | A | | 5/1990 | Obara et al. | | |
| 5,164,645 | A | * | 11/1992 | Furuse | .................. | B60N 2/0232 |
| | | | | | | 318/266 |
| RE34,359 | E | * | 8/1993 | Matsumoto | ............ | B62D 1/181 |
| | | | | | | 280/775 |
| 5,270,932 | A | * | 12/1993 | Yoshizawa | ............. | B62D 1/181 |
| | | | | | | 280/775 |
| 5,419,215 | A | | 5/1995 | Herron et al. | | |
| 6,711,965 | B2 | * | 3/2004 | Tomaru | .................. | B62D 1/181 |
| | | | | | | 280/775 |

(Continued)

FOREIGN PATENT DOCUMENTS

WO 2012051916 A1 4/2012

OTHER PUBLICATIONS

Extended European Search Report Dated Jul. 17, 2015, Application No. 15150728.2-1755, Applicant Volvo Car Corporation, 7 Pages.

*Primary Examiner* — Drew J Brown
(74) *Attorney, Agent, or Firm* — Brooks Kushman P.C.

(57) ABSTRACT

Example embodiments presented herein are directed toward a steering wheel assembly, and corresponding method, for retracting a steering wheel in a vehicle. In the steering wheel retraction, a steering column is configured to first pivot upwards about a horizontal axis directed along the vehicle's width via a pivoting member. Thereafter, the steering wheel column is configured to slide, via an actuating member, in a forward direction towards the instrument panel of the vehicle. Thus, before moving the steering column in a forward direction, the steering wheel is moved away from the driver's legs by the pivoting action. This helps reduce the likelihood of the steering wheel hitting the driver's legs during the retraction.

23 Claims, 9 Drawing Sheets

(56) References Cited

U.S. PATENT DOCUMENTS

| | | | |
|---|---|---|---|
| 8,862,331 B2 * | 10/2014 | Tanaka | B62D 1/181 180/400 |
| 2007/0225883 A1 * | 9/2007 | Maeda | B62D 1/181 701/41 |
| 2015/0149035 A1 * | 5/2015 | Enthaler | B60K 37/06 701/36 |

* cited by examiner

STEERING WHEEL ASSEMBLY FOR RETRACTING A STEERING WHEEL IN A VEHICLE

CROSS-REFERENCE TO RELATED APPLICATIONS

This application claims foreign priority benefits under 35 U.S.C. §119(a)-(d) to European patent application number EP 15150728.2, filed Jan. 12, 2015, which is incorporated by reference in its entirety.

TECHNICAL FIELD

Example embodiments presented herein are directed towards a steering wheel assembly, as well as a corresponding method and computer readable medium, for retracting a steering wheel in a vehicle.

BACKGROUND

In a vehicle, the retraction of the steering wheel may be useful as it provides more room for the driver. Such retraction of the steering wheel will be especially useful to the driver when driving is not required.

A non-driving period is a period in which a driver does not control the vehicle. An example of such a non-driving period is an autonomous driving mode. An autonomous vehicle is one which is capable of sensing its environment and able to operate the vehicle safely without the need for human input. It is envisioned that such vehicles will be capable of transitioning to and from an autonomous driving mode and a manual driving mode, in which a driver manually operates the vehicle. It is further envisioned that such autonomous driving may only be allowed on preapproved or certified roads or zones.

While in an autonomous driving mode, a driver of a vehicle may engage in activities which may not be possible while the vehicle is in a manual driving mode. Examples of such activities are resting, working or using multimedia applications. Thus, the added room and comfort provided by the retraction of the steering wheel may be beneficial in an autonomous driving mode or during non-driving periods in general.

SUMMARY

Steering wheel retraction often involves the telescoping of the steering column such that the entire steering column is moved in and towards the instrument panel of the vehicle. Depending on the location of the driver, such movement may cause the steering wheel to press down on the driver's knees or thighs during retraction.

Thus, at least one example object of some of the example embodiments presented herein is to provide a system for retracting a steering wheel with minimum or no contact with the driver during the retraction. An example advantage of the example embodiments presented herein is increased comfort of the driver as the driver's leg will not come in contact with the steering wheel during the retraction. This results in a safety benefit that the possibility of unintended steering input from the contact is eliminated.

Accordingly, some of the example embodiments are directed towards a steering wheel assembly for retracting a steering wheel in a vehicle. The steering wheel assembly comprises the steering wheel and a steering column attached to the steering wheel. The steering wheel assembly further comprises a pivoting member attached to the steering column and a cross-beam structure of the vehicle. The pivoting member is configured to pivot the steering column in an upward direction about a horizontal axis directed along the vehicle's width. The steering wheel assembly further comprises an actuating member configured to initiate a sliding of the steering column in a forward direction towards the instrument panel of the vehicle. The steering wheel is retracted from a normal driving position by first pivoting the steering column upward via the pivoting member and thereafter sliding the steering column forward via the actuating member. This may be followed in an additional action of pivoting the steering column back down to reduce visual obstruction of the instruments and view out of the windscreen.

An example advantage of the steering wheel assembly is that since the assembly provides for the wheel to be tilted upward before sliding forward towards the instrument panel, the steering wheel is clear from the driver. Thus, the steering column will not likely come into contact with the driver as it slides forward.

According to some of the example embodiments, the pivoting member is a rotational joint activated by an electrical motor or lever connected to a linear actuator. According to some of the example embodiments, the steering column is configured to pivot a maximum of 90 degrees but can be as little as 10 degrees depending on the location of the pivot point. According to some of some of the example embodiments, the actuating member is configured to initiate the steering column to slide in the forward direction within a range 10 to 100 centimeters. The larger the vehicle, the larger the amount of translation that can be permitted to avoid contact with the driver. Translation less than 10 cm may not adequately eliminate the possibility of unintended steering input.

An example advantage of having the steering column pivot a maximum of 90 degrees is providing a clearance between the steering wheel and the driver prior to moving the steering column in the forward direction. An example advantage of moving the steering column in the forward 10 to 100 centimeters is providing more useful space for the driver when not engaged in operating the vehicle.

According to some of the example embodiments, the pivoting member and/or the actuating member are configured to halt the pivoting of and/or the sliding of the steering column, respectively, upon a detection of a resistance during the retraction of the steering wheel. An example advantage of such example embodiments is that the driver can decide not to relinquish control of the vehicle. Additionally, resistance may indicate an obstruction that must be removed. Thus, upon the detection of the contact or resistance, the steering wheel may cease retracting and possibly returned to the normal driving position. The driver may be provided with an audio and/or visual alert that a possible inadvertent steering input may be provided if the steering wheel is to be maintained in the normal driving position.

Some of the example embodiments are directed towards a vehicle comprising the steering wheel assembly described above. According to some of the example embodiments, the steering wheel assembly is configured to retract the steering wheel once the vehicle enters a non-driving period (e.g., an autonomous driving mode, parking, etc.) and/or a front driver seat of the vehicle is allowed to assume a non-driving position, such as retraction towards the rear of the vehicle by a predetermined distance.

While in the non-driving period (e.g., an autonomous driving mode), the driver may engage in activities that would otherwise not be possible. For example, the driver may unfold a newspaper or operate a laptop computer. Thus, retracting the steering wheel when the vehicle enters into an autonomous driving mode allows the driver to have more space to engage in such activities. Similarly, if a driver chooses to move his or her seat rearward, the knees can come into contact with the steering wheel if it is to the rear of the steering wheel. Thus, any action to initiate such a seat retraction may be provided as an indication that the steering wheel shall also be retracted.

According to some of the example embodiments, the steering wheel assembly is configured to position the steering wheel in a manual driving position without interfering with the driver legs when the vehicle is expected to conclude the non-driving period. In addition, the embodiment allows the front driver seat of the vehicle return to a driving position without the steering wheel interfering with the driver legs.

Thus, the steering wheel assembly may automatically detect that the steering wheel shall be placed back in the normal driving position prior to the point that the vehicle is about to conclude the non-driving period and/or in sequence with the driver's seat returning to a normal driving position. This has the example advantage of ensuring the vehicle may be promptly configured for a manual driving mode when needed.

Some of the example embodiments are directed towards a method for retracting a steering wheel with a steering wheel assembly in a vehicle. The steering wheel assembly comprises the steering wheel and a steering column connected to the steering wheel. The steering wheel assembly further comprises a pivoting member connecting the steering column to a cross-beam structure of the vehicle. The steering wheel assembly also comprises an actuating member. The method comprises receiving an indication for steering wheel retraction. The method further comprises pivoting the steering column, via the pivoting member, in an upward direction about a horizontal axis directed along the vehicle's width. The method also comprises, thereafter, initiating a sliding of the steering column, via the actuating member, in a forward direction towards the instrument panel of the vehicle. According to some of the example embodiments, an additional action of pivoting the steering wheel back down to reduce visual obstruction of the instruments and view out of the windscreen may also be performed. It should be appreciated that the steering wheel is titled downward after the forward translation yields sufficient space between the steering wheel and the driver of the vehicle.

An example advantage of the method is that since the assembly provides for the wheel to be tilted upward before sliding forward towards the instrument panel, the steering wheel is clear from the driver. Thus, the steering column will not likely come into contact with the driver as it slides forward.

According to some of the example embodiments, the receiving of the indication further comprises detecting that a non-driving period has started and/or receiving a user initiated command.

While in the non-driving period (e.g., an autonomous driving mode), the driver may engage in activities that would other while not be possible. For example, the driver may unfold a newspaper or operate a laptop computer. Thus, retracting the steering wheel when the vehicle enters into an autonomous driving mode allows the driver to have more space to engage in such activities. An example advantage of the receiving being based on a user initiated command is providing the driver with control over the configuration of the interior of the vehicle.

According to some of the example embodiments, the method further comprises receiving an indication for returning the steering wheel in a driving position. If the steering wheel had been placed back in a downward position after retraction, the method will first comprise pivoting the steering wheel in an upward direction. The method comprises initiating a sliding of the steering column in a rearward direction away from the instrument panel with the steering wheel pivoted towards a ceiling of the vehicle, via the actuating member. The method further comprises, thereafter, pivoting the steering column, via the pivoting member, in a downward direction about a horizontal axis directed along the vehicle's width.

According to some of the example embodiments, the receiving the indication further comprises detecting upcoming conclusion of a non-driving period and/or receiving a user initiated command.

An example advantage of returning the steering column back in the normal driving position based on the received indication is that the steering wheel may be promptly placed back in a normal driving position when needed.

Some of the example embodiments are directed towards a computer readable medium comprising program instructions for retracting a steering wheel with a steering wheel assembly in a vehicle. The steering wheel assembly comprises the steering wheel and a steering column connected to the steering wheel. The steering wheel assembly further comprises a pivoting member connecting the steering column to a cross-beam structure of the vehicle. The steering wheel assembly also comprises an actuating member. The execution of the program instructions by one or more processors of a computer system causes the one or more processors to carry out the steps of, upon receipt of an indication for steering wheel retraction, pivoting, via the pivoting member, the steering column in an upward direction about a horizontal axis directed along the vehicle's width. The steps may further comprise, thereafter, initiating a sliding of the steering column, via the actuating member, in a forward direction towards the instrument panel of the vehicle. According to some of the example embodiments, an additional action of pivoting the steering wheel back down to reduce visual obstruction of the instruments and view out of the windscreen may also be performed.

According to some of the example embodiments, the indication for steering wheel retraction is a detection that a non-driving period has started and/or a user initiated command with the car in a non-driving period.

According to some of the example embodiments, the steps further comprise, upon receipt of an indication for returning the steering wheel in a driving position, initiating a sliding of the steering column in a rearward direction toward the driver and away from the instrument panel, via the actuating member, with the steering wheel in an upward direction, towards a ceiling of the vehicle; and thereafter, pivoting, via the pivoting member, the steering column downward to desired driving position. It should be appreciated that if the steering wheel is initially in the downward position, the process of returning the steering wheel to the driving position would begin with the pivoting of the steering wheel in the upward direction.

According to some of the example embodiments, the indication for returning the steering wheel is a detected end of the non-driving period and/or a user initiated command.

BRIEF DESCRIPTION OF THE DRAWINGS

The foregoing will be apparent from the following more particular description of example embodiments, as illus

DETAILED DESCRIPTION

In the following description, for purposes of explanation and not limitation, specific details are set forth, such as particular components, elements, techniques, etc., in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

The terminology used herein is for the purpose of describing the example embodiments and is not intended to limit the embodiments presented herein. It should be appreciated that the example embodiments discussed herein are in relation to a vehicle. The figures provided feature the vehicle in the form of a car. However, it should be appreciated that a vehicle shall be interpreted to include cars, trucks, busses and construction equipment, as well as airplanes, boats, ships, spacecraft and any other means of transportation.

In a vehicle, the retraction of the steering wheel may be useful as it provides more room for the driver. Such retraction of the steering wheel may be useful in both a manual driving mode and a non-driving period (e.g., an autonomous driving mode) of the vehicle. It should be appreciated that a non-driving period may occur when the vehicle is in an autonomous driving mode, when the vehicle is parked, or whenever the driver of the vehicle is not in control of the vehicle (e.g., when the passenger is in control of the vehicle in a student-driving instructor scenario). In order to better describe the example embodiments presented herein, a problem will first be explained with the use of FIGS. 1-3.

Figure 1:
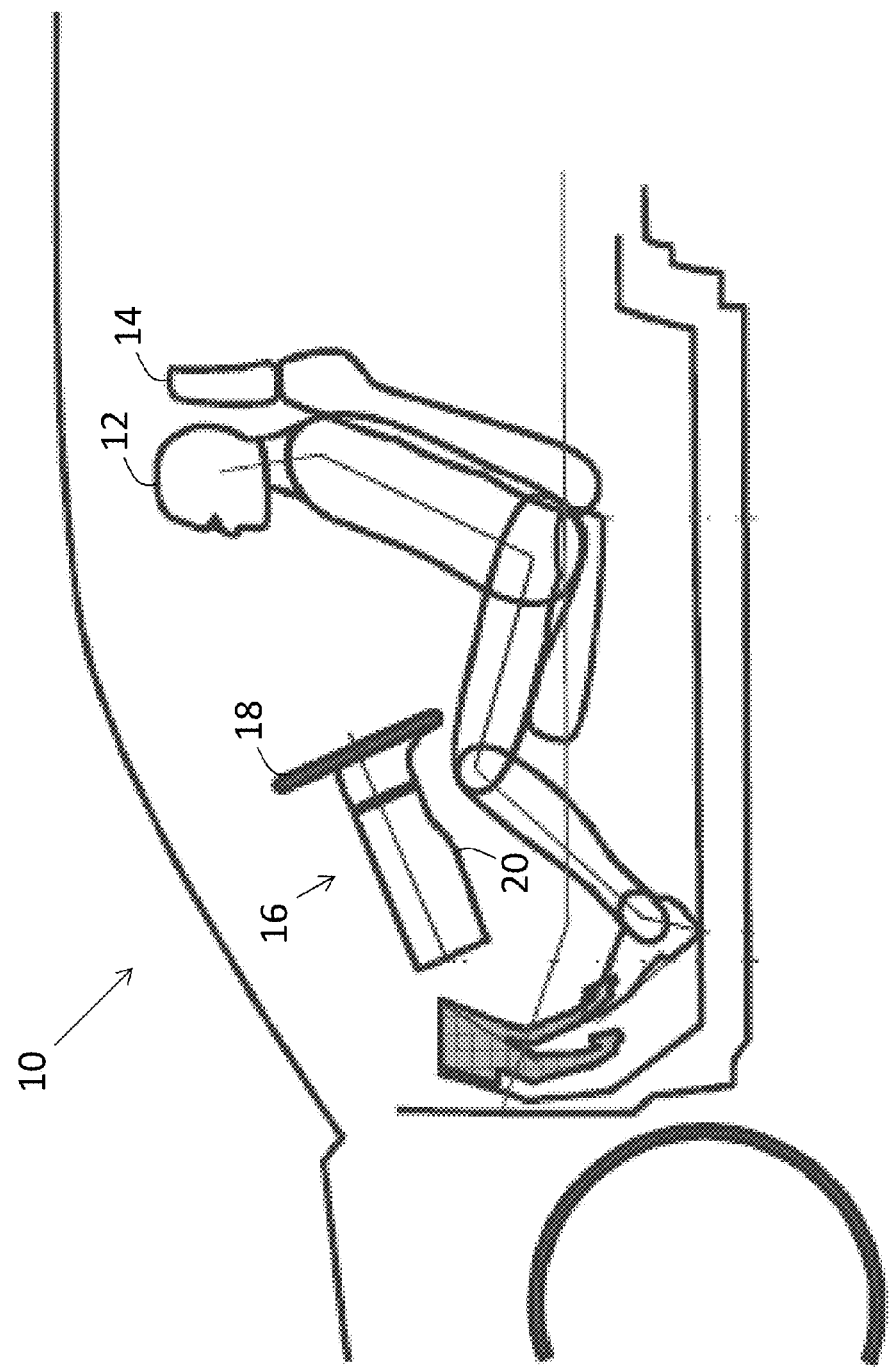
- FIGS. 1-3 illustrate steering wheel retraction in a vehicle.

FIG. 1 provides an example of a steering wheel assembly 16 in a vehicle 10. The steering wheel assembly comprises a steering wheel 18 that is connected to a steering column 20. FIG. 1 illustrates the normal driving position of the steering assembly 16. Such a driving position is used during a manual driving mode of the vehicle. The normal driving position is provided such that there is an adequate clearing between the knees of a driver 12 in a front seat 14 of the vehicle 10 and the steering wheel assembly 16.

Figure 2:
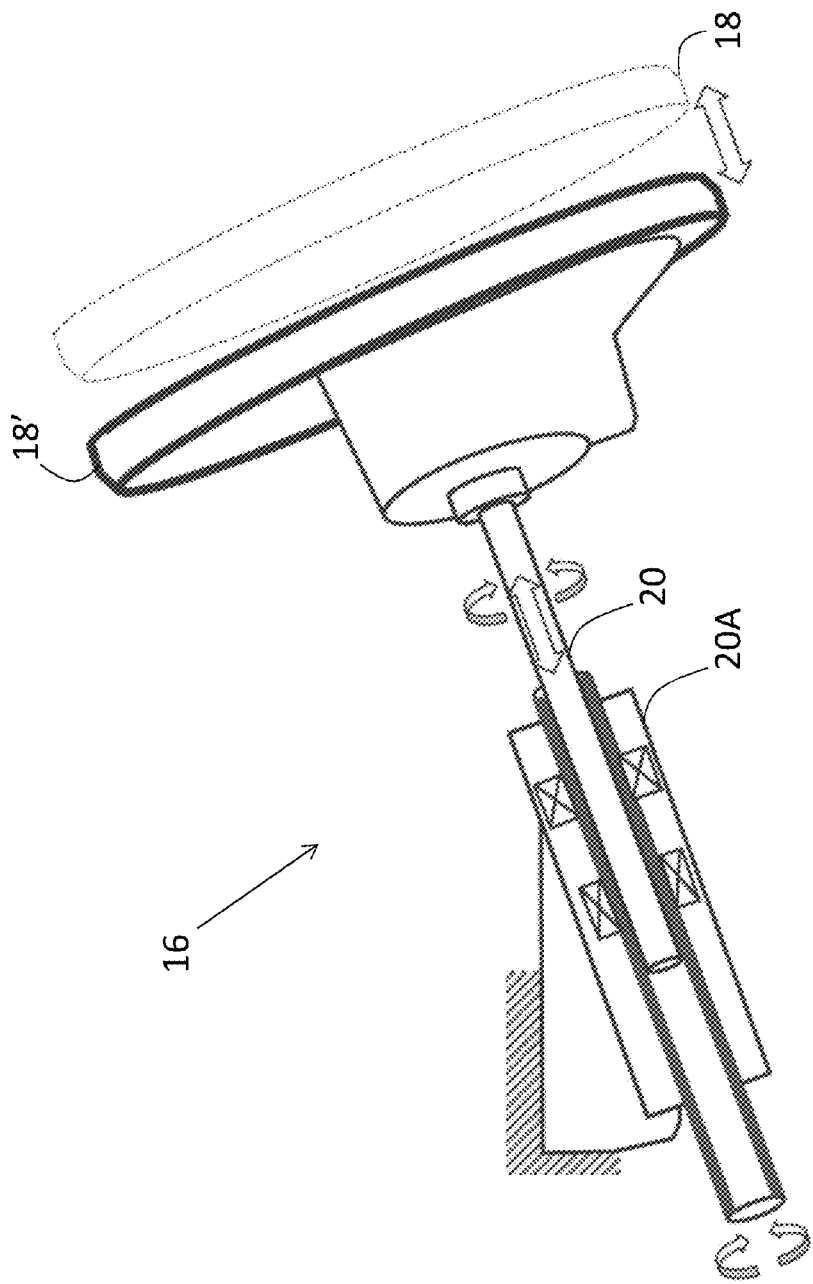

FIG. 2 provides a detailed illustration of the steering wheel assembly 16. In the example provided in FIG. 2, the steering column 20 is comprised in a straight housing 20A. During the retraction of the steering wheel 18, the steering column 20 is configured to slide down the housing 20A towards a floor of the vehicle. This sliding down causes the steering wheel 18 to be in a retracted position 18'.

Figure 3:
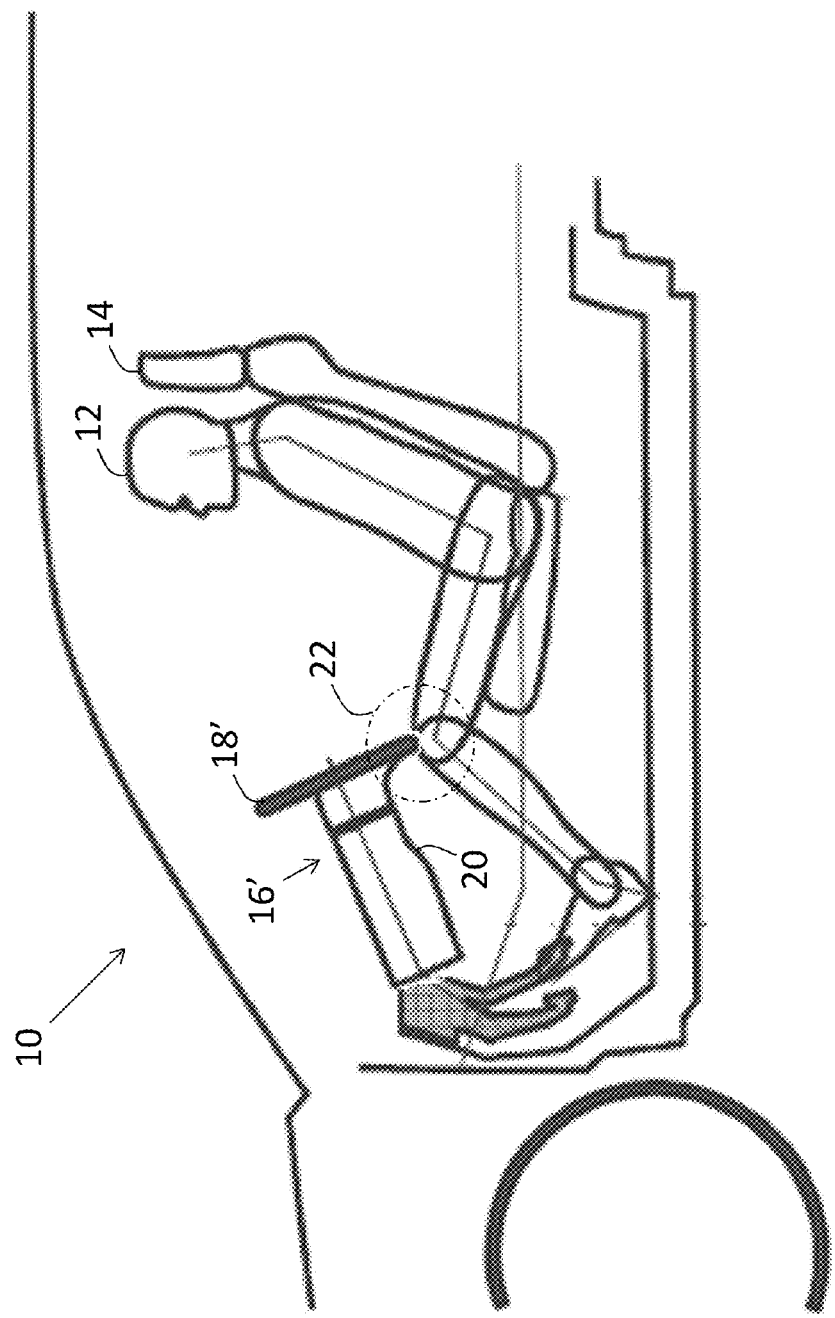

FIG. 3 illustrates the steering wheel assembly 16' of FIGS. 1 and 2 in the retracted position. As shown in FIG. 3, the retracted steering wheel 18', of the retracted steering wheel assembly 16', is in contact with the knees of the driver 12, as illustrated by the highlighted circle 22. Such interference with the driver is caused by the telescoping action of steering column 20 within the housing 20A, as illustrated in FIG. 2.

The interference caused by the retraction of the steering wheel may cause discomfort to the driver as well as the possibility of unintended torque on the steering wheel. Thus, at least one example object of some of the example embodiments presented herein is to provide a system for retracting a steering wheel with minimum or no contact with the driver during the retraction. An example advantage of the example embodiments presented herein is increased comfort and safety of the driver as the legs will not be pressed downward by the steering wheel during the retraction.

Figure 4:
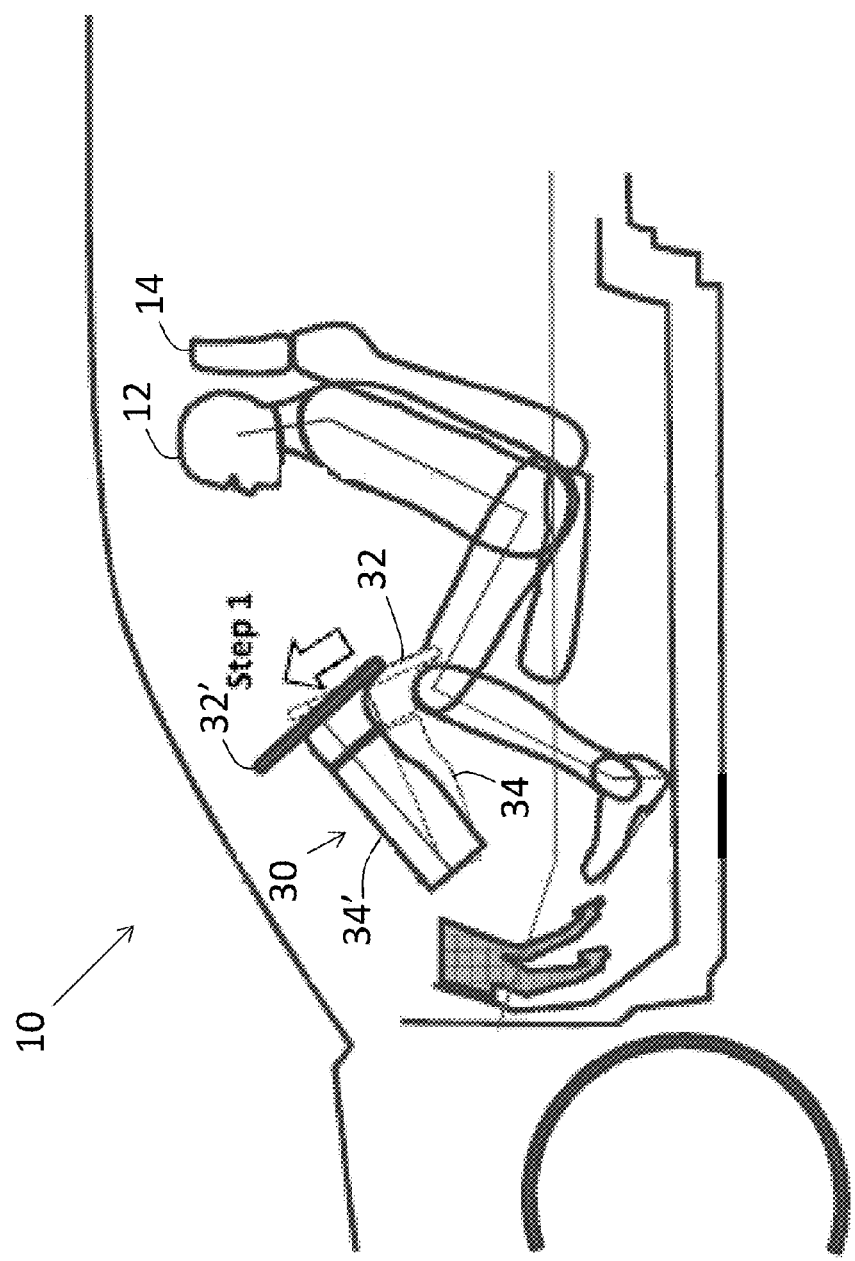
FIGS. 4 and 5 illustrate steering wheel retraction in a vehicle, according to some of the example embodiments presented herein.

According to some of the example embodiments, the retraction of the steering wheel may be performed in two or three steps. FIG. 4 illustrates a first step of the retraction of a steering wheel assembly 30, according to some of the example embodiments presented herein. The steering wheel assembly 30 comprises a steering wheel 32 in connection with a steering column 34. During retraction, the steering column 34 is first pivoted in an upward direction resulting in an altered upward position of the steering column 34' and the steering wheel 32'.

According to some of the example embodiments, the amount of pivoting may be any angle with a maximum angle of 90 degrees. The amount of pivoting needed may vary from different types of vehicles as well as the height of the driver. It should be appreciated that the amount of pivoting of the steering wheel assembly may be adjustable.

Figure 5:
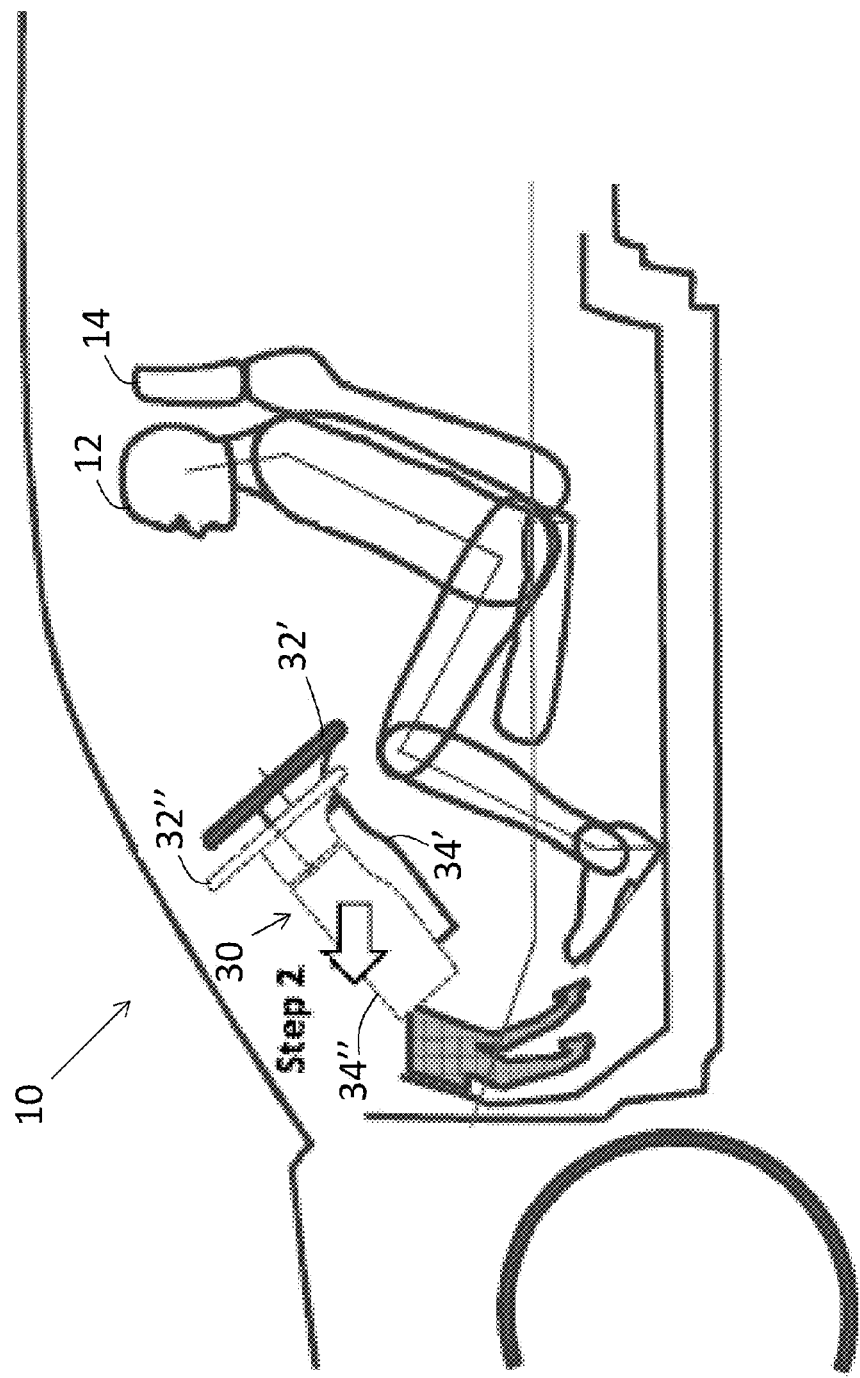

FIG. 5 illustrates the second step of the retraction of the steering wheel assembly 30, according to some of the example embodiments. Once the steering wheel and steering column are in the pivoted positions 32' and 34', respectively, the steering column is thereafter configured to move forward towards the instrument panel of the vehicle. The forward movement results in new altered positions of the steering wheel and steering column, 32" and 34", respectively. As shown in FIG. 5, the retracted position of the steering wheel 32" and steering column 34" provides an adequate clearance between the driver's 12 knees and the retracted steering wheel 32".

According to some of the example embodiments, the amount of sliding may be within the range of 10 to 100 centimeters. The amount of sliding needed may vary from different types of vehicles as well as the height of the driver. It should be appreciated that the amount of sliding of the steering wheel assembly may be adjustable.

According to some of the example embodiments, an optional third step of the retraction of the steering wheel assembly 30 may be utilized. According to some of the example embodiments, once the steering wheel and steering column are in the forward positions 32" and 34", respectively, the steering column is thereafter configured to pivot back down to a position that improves the visibility of instrument panel and outward view through the windscreen.

Figure 6:
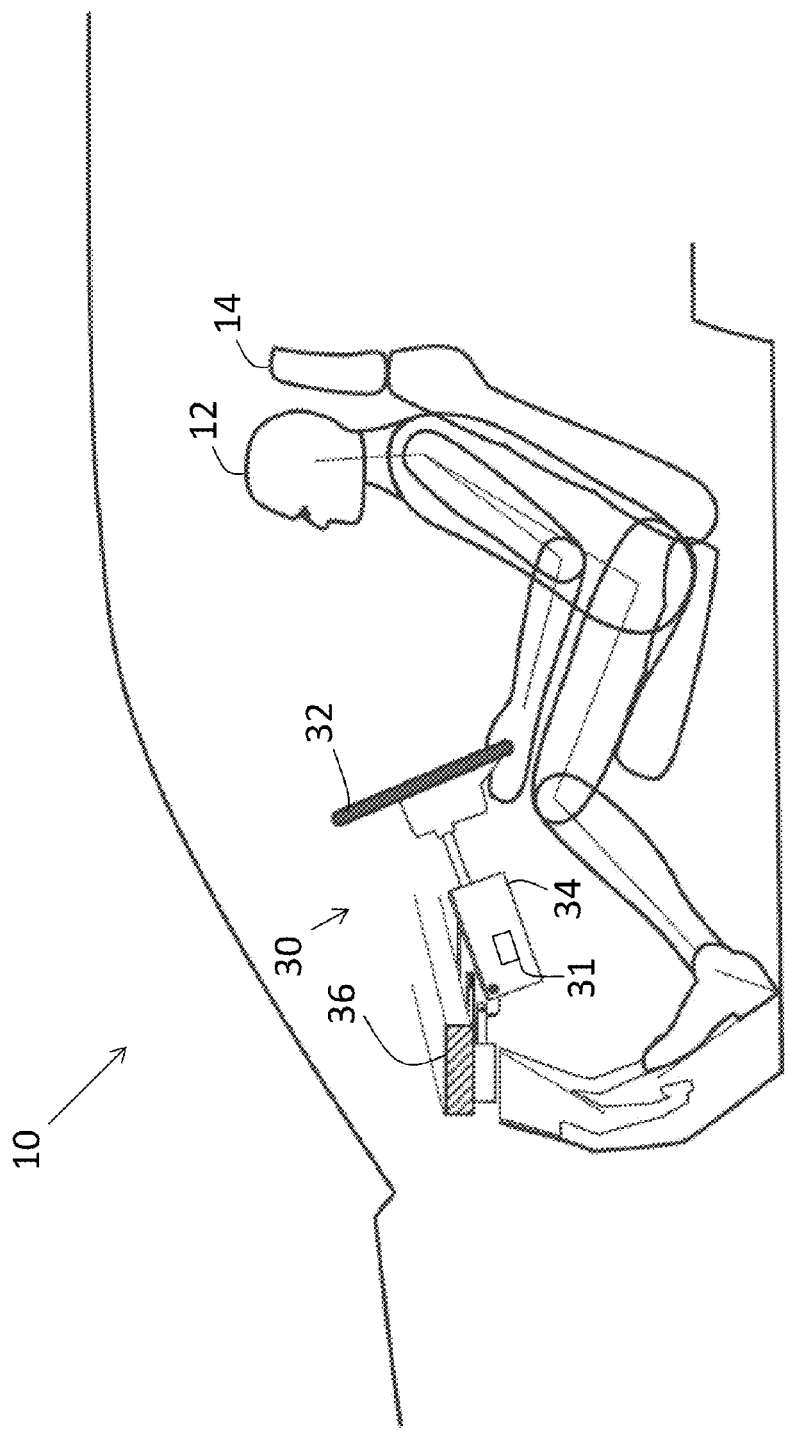
FIG. 6 is an illustrative example of the steering wheel assembly in a vehicle, according to some of the example embodiments presented herein.

FIG. 6 is a detailed illustration of the steering wheel assembly 30, according to some of the example embodiments, as illustrated, the steering column 34, of the steering wheel assembly 30, may be attached to a cross-beam member 36 of the vehicle 10.

The steering wheel assembly 30 may further comprise a control unit 31 that may be configured to initiate or control actions related to the retraction of the steering wheel assembly as discussed herein. The control unit 31 may be any suitable type of computation unit, for example, a microprocessor, digital signal processor (DSP), field programmable gate array (FPGA), or application specific integrated circuit (ASIC), or any other form of circuitry.

Figure 7:
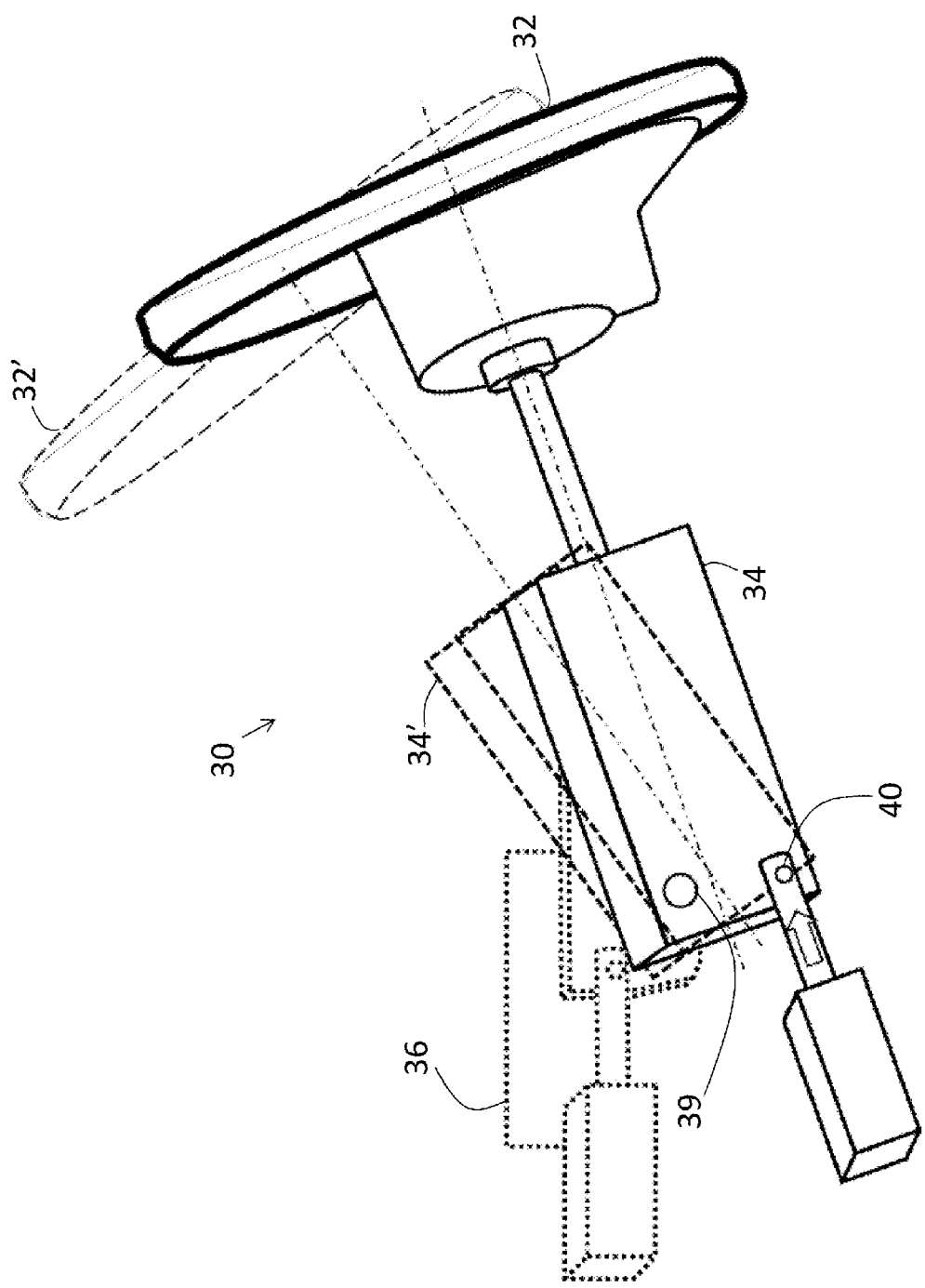
FIGS. 7 and 8 are detailed illustrations of the steering wheel assembly of FIG. 6, according to some of the example embodiments presented herein.

FIG. 7 provides a close-up view of the pivoting motion of the steering wheel assembly 30, specifically the mechanisms which may be involved in the pivoting motion. As illustrated, the steering column 34 comprises two pivoting members 39 and 40. The pivoting members provide the movement in the first step of the steering wheel retraction. Specifically, the pivoting members 39 and 40 cause the steering column 34 to pivot upwards towards the ceiling of the vehicle along a horizontal axis defined by the width of the car. The initial position of the steering wheel 32 and steering column 34 is illustrated with dark lines. The position of the steering wheel 32' and steering column 34' after the pivoting is denoted by dashed lines.

It should be appreciated that any number of pivoting members may be used. Non-limiting examples of such pivoting members are a rotational joint activated by an electrical motor or a lever connected to a linear actuator. It should be appreciated that any mechanism used for pivoting may be employed with the example embodiments presented herein.

Figure 8:
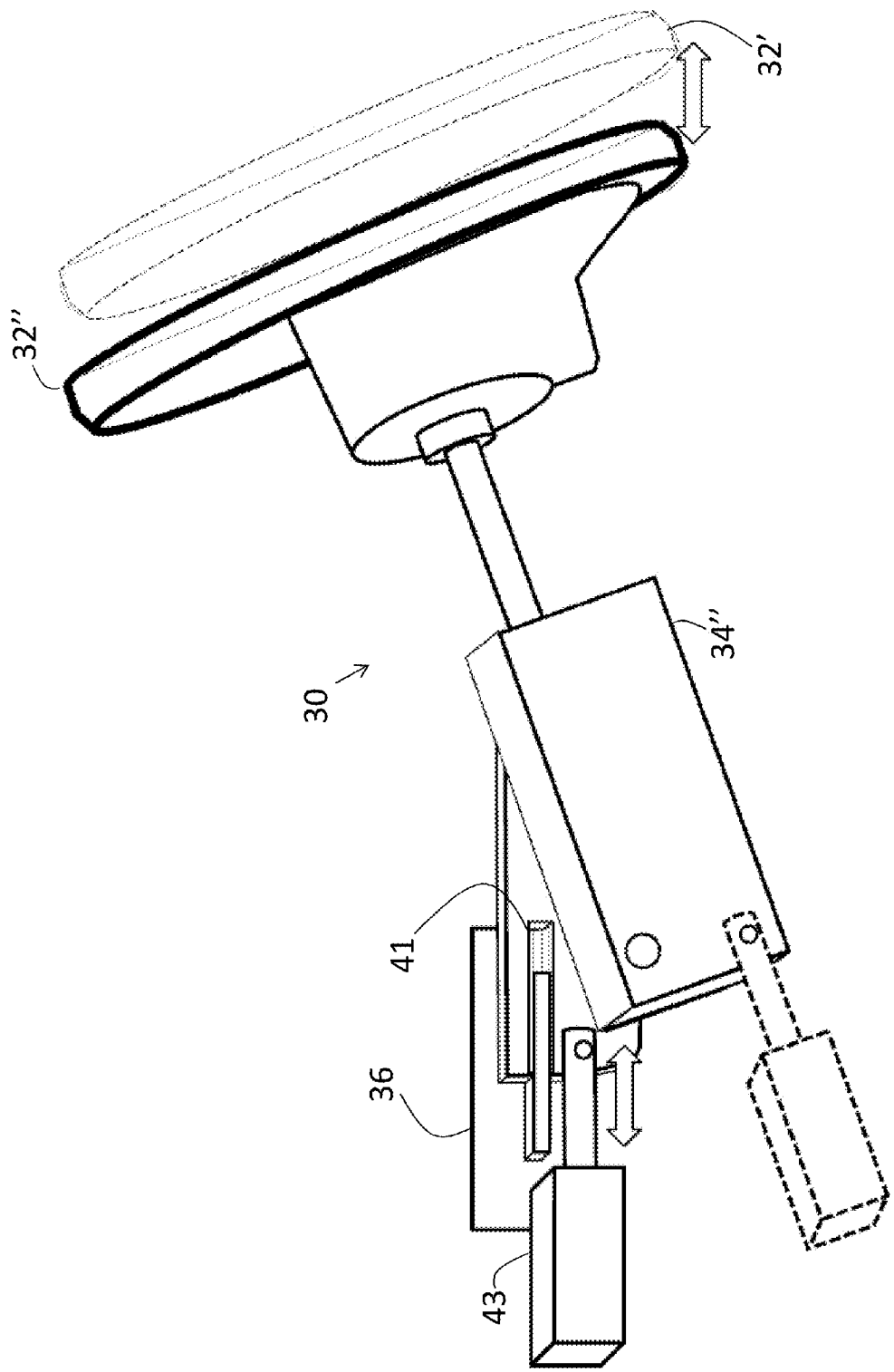

FIG. 8 illustrates a close-up view of the sliding motion of the steering wheel assembly 30, specifically the mechanisms which may be involved in the sliding motion. The steering column 34 is attached to an actuating member 43, and the actuating member 43 is configured to initiate a sliding or other movement of the steering assembly 30 in a forward direction towards the instrument panel during retraction. According to some of the example embodiments, the actuating member 43 may be, for example, a linear actuator, a pressure driven piston, a linear motor, a worm gear, a rack and pinion, a motor driven crank, etc.

In the example provided by FIG. 8, during retraction, the actuating member 43 is configured to move the steering column 34 in a forward direction towards the instrument panel of the vehicle along at least one grooved track 41. In the example provided by FIG. 8, the pivoted steering wheel 32' is illustrated with dashed lines. Upon the downward sliding, the new position of the steering wheel 32" is denoted with a solid line.

It should be appreciated that any number of mechanisms duplicating the function of the grooved tracks may be employed in the example embodiments presented herein. Furthermore, the grooved track may be placed anywhere on the steering assembly. For example, the grooved track may be placed within the steering column 34 or in an external location on the steering column 34.

It should further be appreciated that the steering wheel assembly may further comprise a pressure sensitive surface that may be able to detect contact or resistance during the retraction of the steering wheel. Upon detection of the resistance or contact, the steering wheel assembly may be returned to a normal driving position. It should be appreciated that the pivoting or actuating members may also, or alternatively, be used for detecting a resistance or contact of the steering wheel assembly during the retraction of the steering wheel. An example advantage of such example embodiments is that the driver can decide not to relinquish control of the vehicle. Thus, upon the detection of the contact or resistance, the steering wheel may cease retracting and possibly returned to the normal driving position. The driver may be provided with an audio and/or visual alert that a possible inadvertent steering input may be provided if the steering wheel is to be maintained in the normal driving position.

Figure 9:
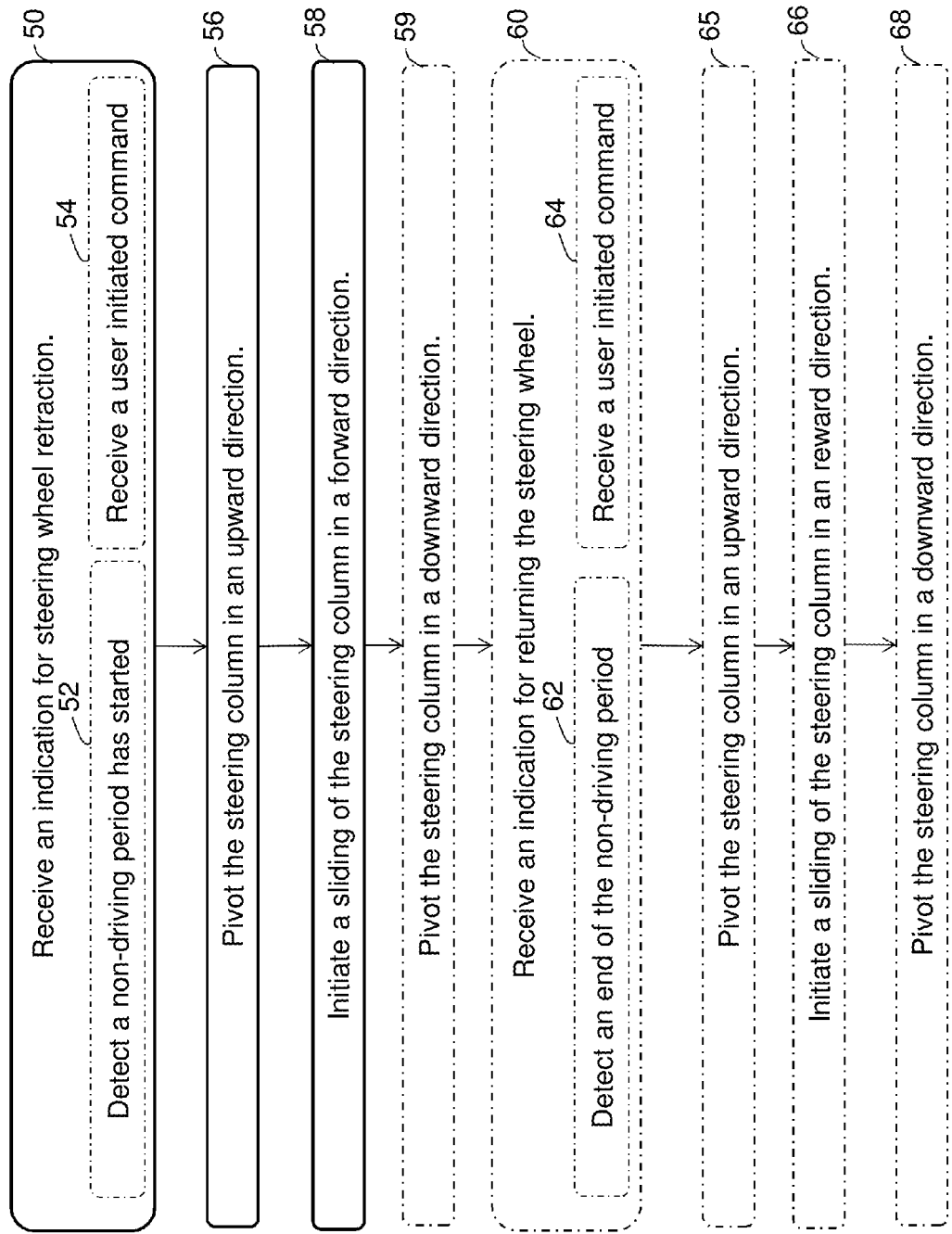
FIG. 9 is a flow diagram of example operations that may be taken by the steering wheel assembly of FIGS. 6-8, according to some of the example embodiments presented herein.

FIG. 9 is a flow diagram depicting example operations which may be taken by the steering wheel assembly described above. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 50

The steering wheel assembly 30 is configured to receive 50 an indication for a steering wheel retraction. The control unit 31 is configured to receive the indication of the steering wheel retraction. An example benefit of providing the steering wheel retraction upon receiving the indication is that the steering wheel may be promptly retracted when needed or when most suitable for the driver.

Example Operation 52

According to some of the example embodiments, the receiving 50 may comprise detecting 52 a start of a non-driving period. The control unit 31 may be configured to detect the start of the non-driving period.

According to such example embodiments, the steering wheel retraction may be performed automatically upon indication that the vehicle is safely in a non-driving period. When the vehicle is in the non-driving period, the driver will be able to engage in activities that he or she would not be able to during a manual driving mode, for example, sleeping or viewing multimedia content. Thus, the driver may be given more space within the vehicle.

It should be appreciated that the steering wheel retraction need not happen automatically once the start of the non-driving periods detected. According to some of the example embodiments, a confirmation, in addition to the detection of the non-driving period, may be needed to retract the steering wheel assembly. Examples of the additional confirmation may be a user input, a seat retraction, etc.

Example Operation 54

According to some of the example embodiments, the receiving 50 may further comprise receiving 54 a user initiated command. The control unit 31 may be configured to receive the user initiated command. An example advantage of providing the steering wheel retraction upon receiving the user initiated command is that the user or driver is provided with more control over the internal configurations of the vehicle.

Operation 56

The steering wheel assembly 30 is further configured to pivot 56 the steering wheel column 34 in an upward direction about a horizontal axis directed along the vehicle's width. The control unit 31 may be configured to control the pivoting of the steering wheel column, via the pivoting member, in the upward direction about the horizontal axis directed along the vehicle's width.

According to some of the example embodiments, the pivoting member may be a rotational joint activated by an electric motor, a worm gear or a lever connected to a linear actuator, as illustrated in FIGS. 6-8. According to some of the example embodiments, the steering column may be configured to pivot a maximum of 90 degrees. An example advantage of the pivoting is that the pivoting allows the steering wheel to be a moved away from the driver. Thus, when the steering wheel is retracted, the steering wheel will not interfere or hit the driver. It should be appreciated that the amount of pivoting may be anywhere from approximately 30 degrees to 90 degrees.

Operation 58

After the pivoting 56, the steering wheel assembly 30 is configured to slide 58 the steering column in a forward direction towards the instrument panel of the vehicle. The control unit 31 and/or the actuating member 43 may be configured to control or initiate the sliding 58 of the steering column in the forward direction away from the driver. According to some of the example embodiments, the steering column may be configured to slide in the forward direction within a range of 10 to 100 centimeters.

Example Operation 59

After the sliding 58, the steering wheel assembly 30 may be configured to pivot 59 the steering column in a downward direction to minimize visual obstruction of the instrument panel and windscreen. The control unit 31 and/or the pivoting member 39, 40 may be configured to pivot the steering column back in a downward direction.

According to some of the example embodiments, the pivoting member and/or the actuating member are configured to halt the pivoting of and/or the sliding of the steering column, respectively, upon a detection of a resistance during the retraction of the steering wheel. An example advantage of such example embodiments is that the driver can decide not to relinquish control of the vehicle. Thus, upon the detection of the contact or resistance, the steering wheel may stop retraction and possibly be returned to the normal driving position. The driver may be provided with an audio and/or visual alert that a possible inadvertent steering input may be provided if the steering wheel is to be maintained in the normal driving position.

Example Operation 60

According to some of the example embodiments, the steering wheel assembly 30 may be further configured to receive 60 an indication for returning the steering wheel in a driving position. The control unit 31 may be configured to receive the indication for returning the steering wheel in the driving position.

Example Operation 62

According to some of the example embodiments, the receiving 60 may comprise detecting 62 a trigger that signals the impending conclusion of a non-driving period. The control unit 31 may be configured to detect the end of the non-driving period. An example advantage of returning the steering wheel assembly in a normal driving position upon detecting an end of the non-driving period is that the steering wheel will promptly be in the correct position when needed.

It should be appreciated that an amount of time may be programmed into the system to get the driver ready, both physically and mentally, for the driving task at the end of a non-driving period. This time may be lengthened if the driver monitoring systems indicate that the driver requires additional time.

Example Operation 64

According to some of the example embodiments, the receiving 60 may comprise receiving 64 a user initiated command. The control unit 31 may be configured to receive the user initiated command. An example advantage of returning the steering wheel assembly upon receiving the user initiated command is that the driver may be given more control over the internal configurations of the vehicle.

Example Operation 65

According to some of the example embodiments, upon receiving 60 the indication, pivoting member may be configured to pivot the steering column in an upward direction if it was in the lower position when retracted. The control unit 31 and/or the pivoting member 39, 40 may be configured to pivot the steering column back in the upward direction.

Example Operation 66

According to some of the example embodiments, the steering wheel assembly may be further configured to slide 66 the steering column in a rearward direction, towards the driver and away from the instrument panel, along the at least one grooved track or other mechanical means. The control unit 31 and/or the actuating member 43 may be configured to control or initiate the sliding of the steering column in the rearward direction, back towards the driver.

Example Operation 68

After the sliding 66, the steering wheel assembly may be further configured to pivot 68 the steering column in a downward direction. The pivoting member 39 and/or 40 may be configured to pivot the steering column in the downward direction. An example advantage of providing the pivoting after the sliding, is that the likelihood of the steering wheel hitting the driver is minimized prior to the driver taking control of the vehicle.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers (e.g., control unit 31) in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A steering wheel assembly for a vehicle, the steering wheel assembly comprising:
    a steering wheel;
    a steering column attachable to the steering wheel;
    a pivoting member attachable to the steering column, wherein the pivoting member is configured to allow the steering column to pivot in an upward direction about a horizontal axis directed along a width of the vehicle; and
    an actuating member configured to initiate a sliding of the steering column in a forward direction toward an instrument panel of the vehicle;
    wherein the steering wheel is retractable from a normal driving position by first pivoting the steering column upward via the pivoting member and thereafter sliding the steering column forward via the actuating member, and wherein the steering wheel assembly is configured to retract the steering wheel when a front driver seat of the vehicle is retracted toward the rear of the vehicle a predetermined amount.

2. The steering wheel assembly of claim 1 wherein the pivoting member is a rotational joint activatable by an electrical motor, a worm gear, or lever connected to a linear actuator.

3. The steering wheel assembly of claim 1 wherein the steering column is configured to pivot a maximum of 90 degrees.

4. The steering wheel assembly of claim 1 wherein the actuating member is configured to initiate a sliding of the steering column within a range 10 to 100 centimeters.

5. The steering wheel assembly of claim 1 wherein the pivoting member and/or the actuating member are/is configured to halt the pivoting of and/or the sliding of the steering column, respectively, upon a detection of a resistance during the retraction of the steering wheel.

6. The steering wheel assembly of claim 1 wherein the pivoting member is movable with the steering column during the sliding.

7. A vehicle comprising:
    an instrument panel;
    a movable front driver seat; and
    a steering wheel assembly including:
        a steering wheel;
        a steering column attached to the steering wheel;
        a pivoting member attached to the steering column, wherein the pivoting member is configured to allow the steering column to pivot in an upward direction about a horizontal axis directed along a width of the vehicle; and
        an actuating member configured to initiate a sliding of the steering column in a forward direction toward the instrument panel;
        wherein the steering wheel is retractable from a normal driving position by first pivoting the steering column upward via the pivoting member and thereafter sliding the steering column forward via the actuating member, and wherein the steering wheel assembly is configured to retract the steering wheel once the front driver seat is retracted toward a rear of the vehicle a predetermined amount.

8. The vehicle of claim 7 wherein the steering wheel assembly is further configured to retract the steering wheel once the vehicle detects a start of a non-driving period.

9. The vehicle of claim 7 wherein the steering wheel assembly is configured to position the steering wheel in the driving position once the vehicle is expected to conclude a non-driving period and/or the front driver seat of the vehicle returns to a driving position.

10. The vehicle of claim 7 wherein the steering wheel assembly is further configured to retract the steering wheel upon an indication that the vehicle is in an autonomous driving mode.

11. The vehicle of claim 7 wherein the pivoting member is movable with the steering column during the sliding.

12. A non-transitory computer readable medium comprising program instructions for retracting a steering wheel of a steering wheel assembly in a vehicle, wherein the steering wheel assembly further comprises a steering column connected to the steering wheel, a pivoting member connected to the steering column, and an actuating member, wherein the program instructions are configured for execution by one or more processors of a computer system and comprise instructions for:
    upon receipt of an indication for steering wheel retraction, pivoting the steering column, via the pivoting member, in an upward direction about a horizontal axis directed along a width of the vehicle; and
    thereafter, initiating a sliding of the steering column and the pivoting member, via the actuating member, in a forward direction towards an instrument panel of the vehicle;
    wherein the indication for steering wheel retraction comprises a front driver seat of the vehicle being retracted towards a rear of the vehicle a predetermined amount.

13. The computer readable medium of claim 12 wherein the indication for steering wheel retraction further comprises a detection that a non-driving period has started and/or a user initiated command.

14. The computer readable medium of claim 12 further comprising instructions for:
    upon receipt of an indication for returning the steering wheel in a driving position, initiating a sliding of the steering column, via the actuating member, in a rearward direction, toward the driver; and thereafter, pivoting the steering column, via the pivoting member, in a downward direction to restore a manual driving position.

15. The computer readable medium of claim 14 wherein the indication for returning the steering wheel is a detected end of a non-driving period and/or a user initiated command.

16. A method for retracting a steering wheel of a steering wheel assembly in a vehicle, wherein the steering wheel assembly further comprises a steering column connected to the steering wheel, a pivoting member connected to the steering column, and an actuating member, the method comprising:

receiving an indication for steering wheel retraction, wherein the indication comprises a front driver seat of the vehicle being retracted towards the rear of the vehicle a predetermined amount;

pivoting the steering column, via the pivoting member, in an upward direction about a horizontal axis directed along the vehicle's width; and thereafter, initiating a sliding of the steering column, via the actuating member, in a forward direction toward an instrument panel of the vehicle.

17. The method of claim 16 wherein the pivoting member is movable with the steering column during the sliding.

18. The method of claim 16 wherein the indication further comprises the vehicle being in an autonomous driving mode.

19. The method of claim 16 wherein the steering wheel assembly further comprises a control unit, and the receiving the indication comprises receiving the indication by the control unit.

20. The method of claim 19 wherein the receiving the indication further comprises detecting, by the control unit, that a non-driving period has started and/or receiving a user initiated command.

21. The method of claim 16 wherein the receiving the indication further comprises detecting, by the steering wheel assembly, that a non-driving period has started and/or receiving a user initiated command.

22. The method of claim 16 further comprising:

receiving, by the steering wheel assembly, an indication for returning the steering wheel to the driving position;

initiating a sliding of the steering column, via the actuating member, in a rearward direction, towards the driver; and thereafter, pivoting the steering column, via the pivoting member, in a downward direction to restore the desired manual driving position.

23. The method of claim 22 wherein the receiving the indication further comprises detecting, by the steering wheel assembly, an end of a non-driving period and/or receiving a user initiated command.

* * * * *